United States Patent

Hasegawa

(10) Patent No.: US 6,922,503 B2
(45) Date of Patent: Jul. 26, 2005

(54) OPTICAL SYSTEM MODULE

(75) Inventor: Takemi Hasegawa, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 210 days.

(21) Appl. No.: 10/417,127

(22) Filed: Apr. 17, 2003

(65) Prior Publication Data

US 2004/0105639 A1 Jun. 3, 2004

(30) Foreign Application Priority Data

Nov. 29, 2002 (JP) ........................................ 2002-348551

(51) Int. Cl.[7] .......................... G02B 6/26; G02B 6/00; G02B 6/02; H04B 10/12
(52) U.S. Cl. .......................... 385/28; 385/31; 385/123; 385/124; 385/126; 385/125; 359/341.1; 359/341.3; 359/341.31
(58) Field of Search .................... 385/28, 31, 123–126; 359/341.1, 341.3, 341.31, 330, 334; 398/79, 92

(56) References Cited

U.S. PATENT DOCUMENTS

| | | | | |
|---|---|---|---|---|
| 3,875,422 A | * | 4/1975 | Stolen | 359/330 |
| 5,802,236 A | | 9/1998 | DiGiovanni et al. | 385/127 |
| 6,400,866 B2 | | 6/2002 | Ranka et al. | 385/28 |
| 6,453,094 B1 | * | 9/2002 | Yue | 385/37 |
| 6,693,737 B2 | * | 2/2004 | Islam | 359/334 |
| 6,813,066 B2 | * | 11/2004 | Islam | 359/334 |
| 6,847,758 B1 | * | 1/2005 | Watanabe | 385/27 |

FOREIGN PATENT DOCUMENTS

WO    WO 02/39161 A1    5/2002

OTHER PUBLICATIONS

"Designing the properties of dispersion–flattened photonic crystal fibers", Ferrando, et al., Optics Express, Dec. 17, 2001, vol. 9, No. 13, pp. 688–697.
"Photonic Crystal Fibres: An Endless Variety", Birks, et al., IEICE Trans. Electron., vol. E84–C, No. 5, May 2001, p. 585–592.
"Dispersion–flattened fiber for efficient supercontinuum generation", Taccheo, et al., OFC 2002, Thursday Afternoon, pp. 565–567.
"Analysis of Optical Regeneration Utilizing Self–Phase Modulation in a Highly–Nonlinear Fiber". Matsumoto et al., IEEE Photonics Technology Letters, vol. 14, No. 3, Mar. 2002, pp. 319–321.
"Broadband fiber opticul parametric amplifiers", Marhic, et al., Optics Letters, Apr. 15, 1996, vol. 21, No. 8, pp. 573—575.
"Nonlinear Fiber Optics", Agrawal, Quantum Electronics—Principles and Applications, 1989, pp. 292–295, ISBN 0–12–045140–9.
"Wave Theory of Uniform–Core Fibers", Okoshi, Optical Fibers, 1982, pp. 52–71.
"All–Optical Data Regeneration Based on Self–Phase Modulation Effect", Mamyshev, ECOC '98, Madrid, Spain, Sep. 20–24, 1998, pp. 475–576.

* cited by examiner

Primary Examiner—Frank G. Font
Assistant Examiner—Mary El-Shammaa
(74) Attorney, Agent, or Firm—McDermott Will & Emery LLP

(57) ABSTRACT

An optical module comprises a multiplexer for combining a signal and a pump radiation and having an output coupled to an optical fiber and a signal over the optical fiber with the pump lightwave that has a frequency three times of that of the signal and phase index equal to that of the signal. Phase matching between the pump and signal is realized for example by employing a microstructured optical fiber as the optical fiber.

14 Claims, 6 Drawing Sheets

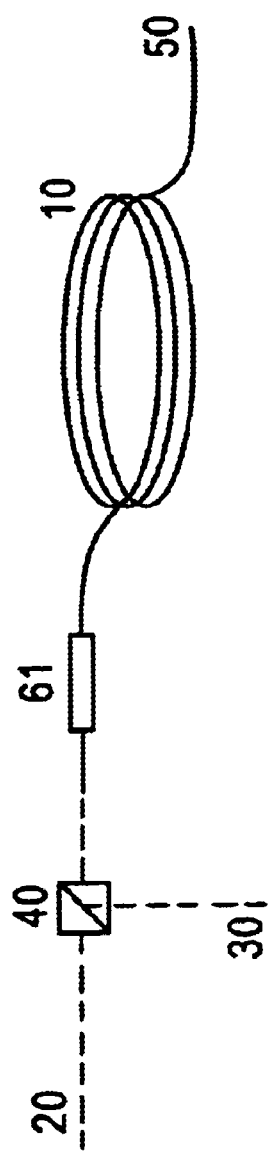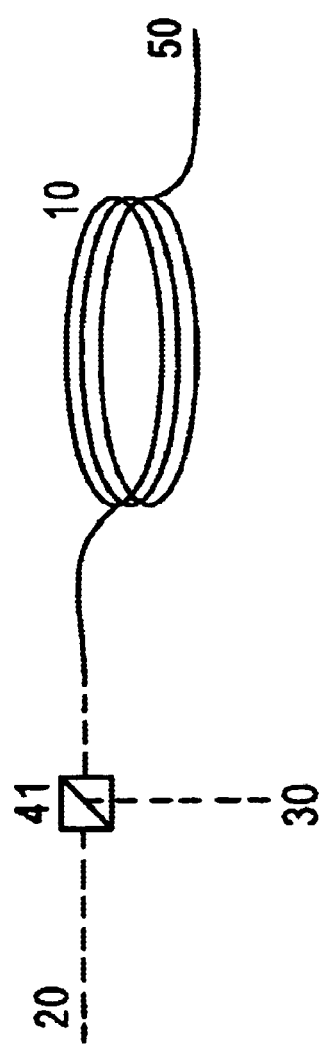

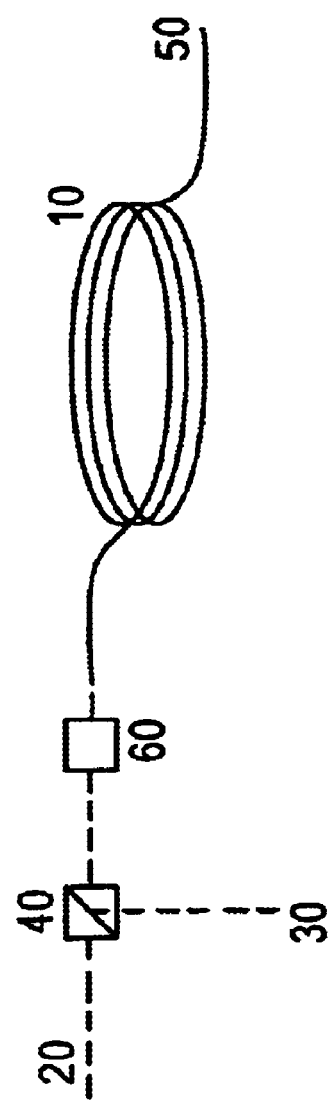

OPTICAL SYSTEM MODULE

FIELD OF THE INVENTION

The present invention relates to optical modules, more particularly to configurations in which the gain of a signal increases with the increase in input signal power.

BACKGROUND

The recent development of the microstructured optical fiber, in which a high index core region is surrounded by cladding having a mix of silica and air, offers new fiber properties by virtue of the large refractive-index contrast that exists between glass and air.

Reference is made to Section 4.3.6 of Takanori Okoshi, "Optical Fibers", Academic Press (1982) for discussion of the modes of an optical fiber. As described therein, $HE_{11}$ mode is the fundamental mode and the others are the higher-order modes.

A properly designed microstructured optical fiber can support numerous transverse spatial modes that are essentially decoupled from one another, as described in U.S. Pat. No. 6,400,866. In one disclosed embodiment, an optical pump propagates in one transverse mode, and an optical signal in another. A microstructured optical fiber, which can support several decoupled transverse modes, can be used to phase match nonlinear optical processes such as second harmonic generation and four-wave mixing. An optical pump and an optical signal are coupled into respective transverse modes of a microstructured optical fiber having decoupled transverse modes. As a result, a third signal is generated, which may be, for example, a sum or difference frequency signal, a second or third harmonic signal, signals at frequencies above and below the pump frequency. While this patent suggests the usage of higher-order modes of a microstructured optical fiber for nonlinear optical processes, there is no suggestion of how, or recognition that, optical signal regeneration can be obtained free from frequency conversion.

A paper entitled *All-Optical Data Regeneration Based On Self-Phase Modulation Effect*, P. V. Mamyshev, ECOC'98 p.475 (1998) describes feeding a pulsed optical signal of return-to-zero (RZ) format into a nonlinear medium, where self-phase modulation (SPM) broadens the spectra of the signal. The output from the nonlinear medium passes through an optical filter having a central frequency offset from that of the original signal. By this configuration, the noise in "zeros" and the amplitude fluctuation in "ones" of the signal is suppressed, so that the signal is regenerated. However, the regenerated signal must have a frequency different from that of the original signal, so that the complexity of optical system increases by the incorporation of the regenerating module. Also, it is difficult to incorporate this regenerating module into existing optical systems.

The need thus exists in the prior art for an optical module of simple configuration that provides an increase in signal gain with increase of signal input power and that can phase match pump radiation and signal.

SUMMARY OF THE INVENTION

The present invention fulfills the above described, at least in part, by provision of a module that propagates a signal over an optical fiber with a pump lightwave that has a frequency three times of that of the signal and a phase index equal to that of the signal. Phase matching between the pump and signal is realized by employing a microstructured optical fiber. The following terms are defined to aid description of microstructured fiber characteristics.

A main medium is a medium that can constitute an optical fiber by itself. On the other hand, a sub medium is not necessarily able to constitute an optical fiber by itself. For example, glasses and polymers can be used as a main medium or a sub medium, while liquids, gases and vacuum can be used as a sub medium but not a main medium.

The average refractive index of a region composed of several media i (i=1 ... M) is defined by the following formulas:

$$n_{avg} = \left\{ \left( \sum_{i=1}^{M} n^2[i] f[i] \right) \Big/ \left( \sum_{i=1}^{M} f[i] \right) \right\}^{\frac{1}{2}}$$

wherein n[i] and f[i] are respectively the refractive index and the volume of medium i.

The phase index of a mode is the ratio of the light speed in vacuum to the phase velocity of the mode. The nonlinear refractive index $n^{(2)}$ is related to the component $\chi^{(3)}_{xxxx}$ of the third-order susceptibility tensor by $n^{(2)}=(3/8n) \chi^{(3)}_{xxxx}$ in the case of linearly polarized lightwave, where n is the refractive index. A wavelength of light is that in vacuum unless specified otherwise.

Advantages of the present invention will become readily apparent from the following detailed description, simply by way of illustration of the best mode contemplated of carrying out the invention. The invention is capable of other and different embodiments, and its several details are capable of modifications in various obvious respects, all without departing from the invention. Accordingly, the drawing and description are illustrative in nature, not restrictive.

BRIEF DESCRIPTION OF THE DRAWINGS

The present invention is illustrated by way of example, and not by way of limitation, in the figures of the accompanying drawing and in which like reference numerals refer to similar elements and in which:

FIGS. 6–8 are schematic diagrams of additional optical module modifications in accordance with the present invention.

DETAILED DESCRIPTION OF THE INVENTION

Figure 1:
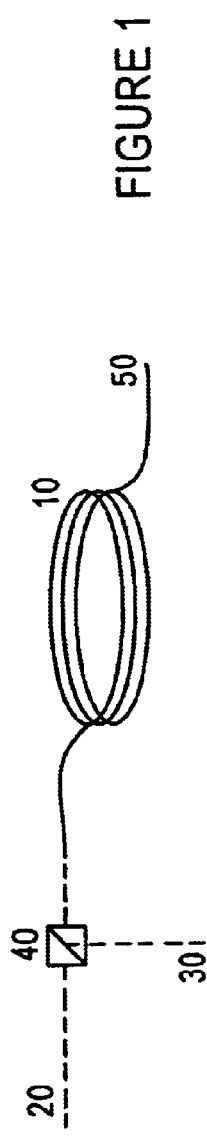
FIG. 1 is a schematic diagram of an optical module of a first embodiment of the invention.

FIG. 1 is a schematic diagram of an optical module of a first embodiment of the invention. A multiplexing means 40 is coupled to an end of optical fiber 10. The multiplexing means 40 combines an optical signal launched into a first port 20 and radiation of an optical pump launched into a second port 30, and launches the combined signal and pump radiation into the optical fiber. The other end of the optical fiber is coupled to a third port 50, which emits the optical signal.

Figure 2:
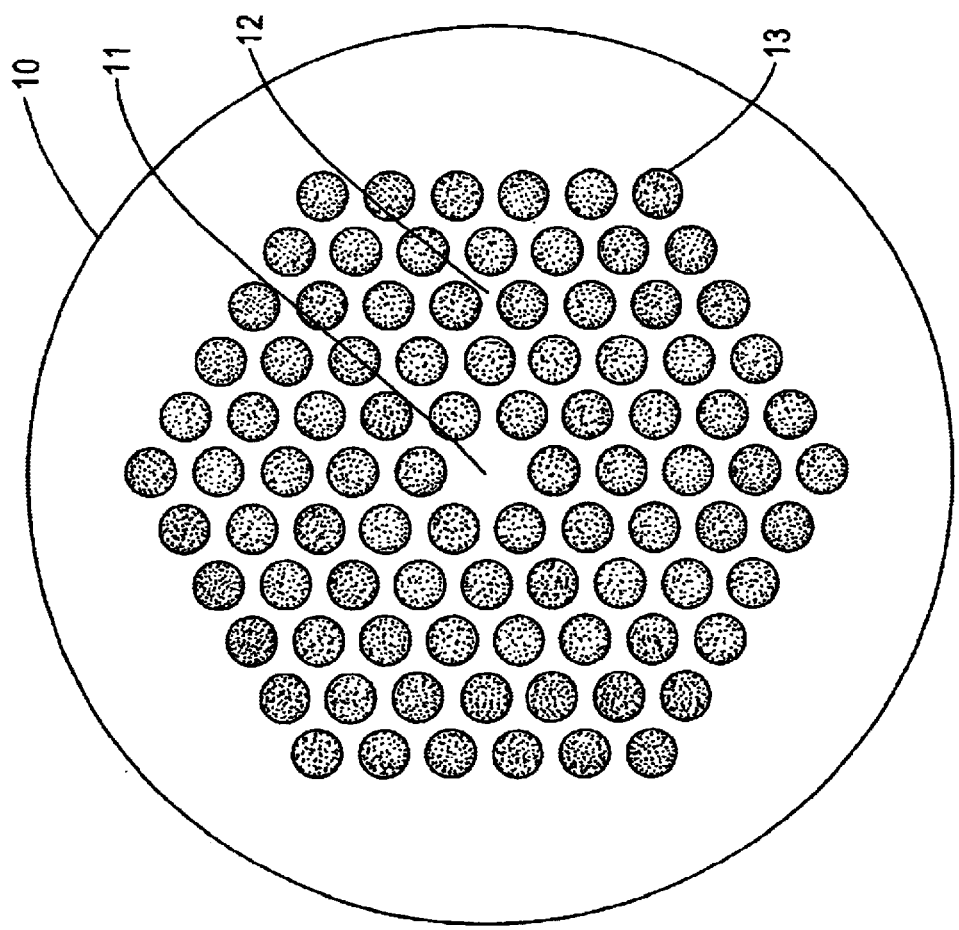
FIG. 2 is an illustration of a cross section taken perpendicular to the fiber axis of the optical fiber of FIG. 1.

FIG. 2 is an illustration of a cross section taken perpendicular to the fiber axis of the optical fiber 10. Core region 11 is surrounded by a cladding region 12. The core is composed of silica glass 14, which is a main medium. The cladding is composed of silica glass 14 and air holes 13, which are regions of sub mediums. A plurality of holes are arranged in silica glass in the cladding. Because of this configuration, the core region has a higher average refractive index than the cladding, so that a lightwave localizes in the core and propagates along the fiber.

Figure 3:
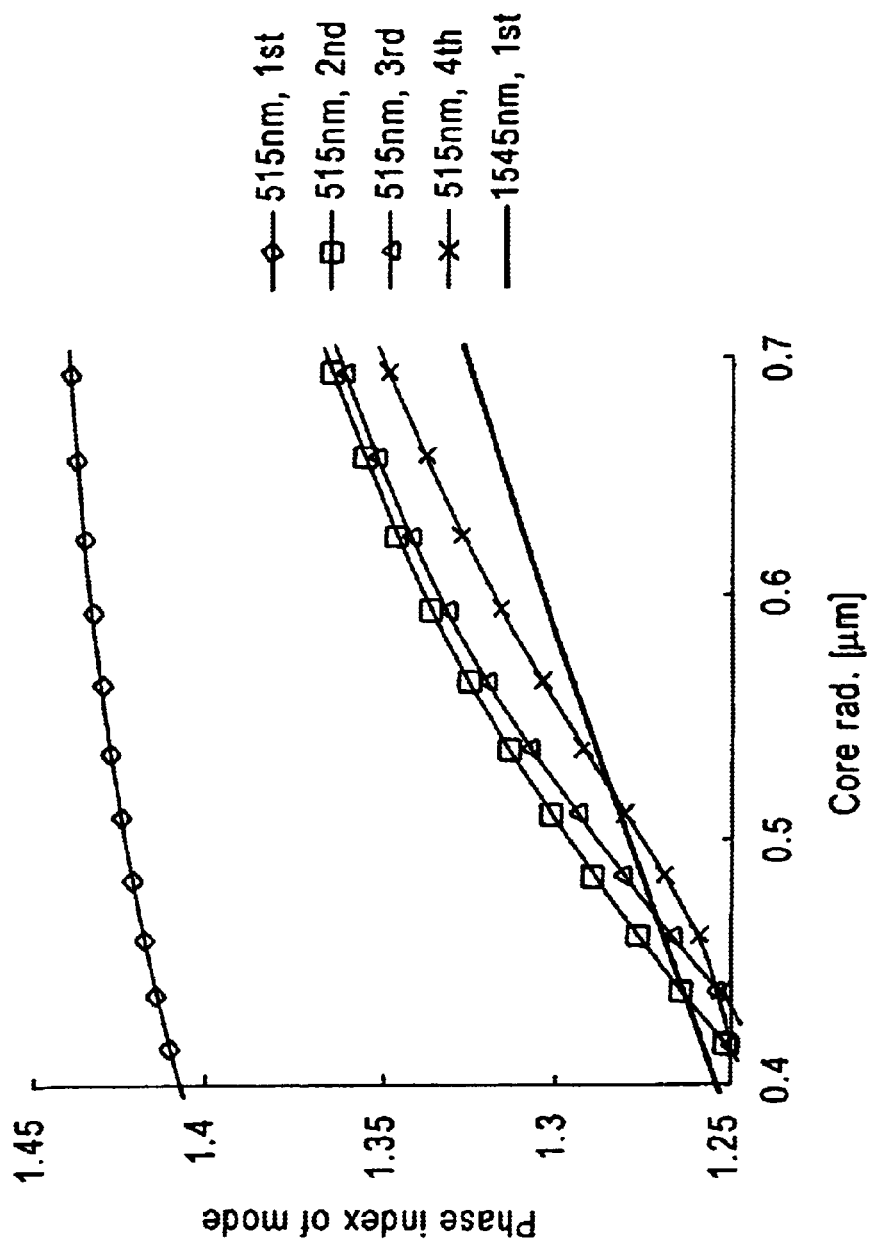
FIG. 3 is a graph showing the dependence of the phase indices of the guided modes of the optical fiber of FIG. 2 on the radius of the core.

FIG. 3 is a graph showing the dependence of the phase indices of the guided modes of the optical fiber 10 on the radius of the core. The phase indices at the signal wavelength $\lambda 1=1545$ nm and at the pump wavelength $\lambda 2=515$ nm are evaluated. In the evaluation, the cladding region is approximated by a uniform medium having a refractive index equal to the average index of the cladding region. The area fraction of the holes is assumed to be 50% in the cladding. As shown in the figure, matching of phase index can be realized between the fundamental mode at the signal wavelength $\lambda 1$ and one of the higher-order modes at the pump wavelength $\lambda 2$, when the core radius is between 0.40 $\mu$m and 0.55 $\mu$m, so that the core radius has been chosen to be approximately 0.51 $\mu$m in this embodiment. By employing a microstructured optical fiber, a phase matching robust to external perturbations can be realized.

Among the higher order modes, a $HE_{1m}$ (m>1) mode is desirable for use in the present invention, because the pump-signal overlap integral with the $HE_{11}$ mode signal is higher for a pump of a $HE_{1m}$ (m>1) mode than the pumps of the other higher order modes, where the pump-signal overlap integral f is defined by the following expression:

$$f = \frac{\int\int (E_1 \cdot E_1)(E_1 \cdot E_2^*) dA}{\sqrt{(\int\int |E_1|^2 dA)^3 \int\int |E_2|^2 dA}},$$

where $E_1$ and $E_2$ are respective electric field vectors of the signal and the pump, dA is an area fraction, * shows complex conjugate, and the integral region is the whole cross section. The inner product (●) of vector $E_a$ and $E_b$ is defined by $$(E_a \cdot E_b) = E_{a,x} E_{b,x} + E_{a,y} E_{b,y},$$

where $E_{a,x}$ and $E_{a,y}$ are the components of $E_a$ along x and y coordinates, which are within the cross section of the optical fiber. In the pump-signal overlap integral here, z component of electric field, which is along the fiber length, is neglected because it is typically small. It is known that the efficiency of a nonlinear optical effect is in proportion to such an overlap integral, as described in Section 10.2 of Govind P. Agrawal, "Nonlinear Fiber Optics," Academic Press.

In embodiment 1, the 2nd, 3rd, and 4th modes at the pump wavelength $\lambda 2$ shown in FIG. 2 are higher order modes of $EH_{11}$, $HE_{31}$, and $HE_{12}$, respectively. While the optical fiber might have other higher order modes at $\lambda 2$, they are not shown in FIG. 2 for brevity. The pump-signal overlap integrals of the 2nd, 3rd, and 4th modes at the pump wavelength $\lambda 2$ with the 1st (fundamental) mode at the signal wavelength $\lambda 1$ are 0.08 $\mu m^{-2}$, 0.006 $\mu m^{-2}$, and 0.25 $\mu m^{-2}$, respectively. Because of similarity in the way of distribution of electric field to that of the $HE_{11}$ mode, a $HE_{1m}$ (m>1) mode can have a high overlap integral with the $HE_{11}$ mode. Therefore, it is preferable to use a pump of a $HE_{1m}$ (m>1) mode for obtaining a high overlap integral and thereby a high efficiency of nonlinear optical effect.

In the present embodiment, the core radius is 0.43 $\mu$m, so that the phase indices of the fundamental mode at $\lambda 1$ and the second mode (lowest of the higher-order modes) at $\lambda 2$ are matched. The signal at $\lambda 1$ is launched into the first port in the fundamental mode, and coupled to the fundamental mode of the optical fiber via the multiplexing means. The pump at $\lambda 2$ is launched into the second port in the second mode, and coupled to a higher-order mode of the optical fiber via the multiplexing means. It is preferable to employ a surface emitting laser diode as an optical source generating an optical pump in higher-order modes.

The propagation of the signal and pump in the optical fiber can be described by the following expressions (1), and (2).

$$\frac{d}{dz} E_1 = \frac{i}{6} n^{(2)} k_1 E_1^* E_2, \quad (1)$$

$$\frac{d}{dz} E_2 = \frac{i}{6} n^{(2)} k_2 E_1^3, \quad (2)$$

where $E_1$ and $E_2$ are respectively the slowly-varying field amplitudes of the signal and pump, z is the coordinate along the fiber, i is the imaginary unit, $n^{(2)}$ is the nonlinear refractive index, $k_1$ and $k_2$ are respectively the wavenumbers of the signal and pump, and E* denotes a complex conjugate of E. The expressions (1), and (2) are based on the assumption that self-phase modulation, cross-phase modulation, and attenuation by the fiber are not significant.

By taking the assumption that $|E_1| \ll |E_2|$, which is usually valid, and that the variation in $E_2$ is hence not significant, it follows from expression (1) that $$\frac{d^2}{a^2 dz^2} P_1 = P_2 P_1^2, \quad (3)$$

where $$a = \frac{n^{(2)} k_1}{\sqrt{6} A}, \quad (4)$$

$P_1$ and $P_2$ are respectively the optical powers of the signal and pump, and A is given from the effective core areas of the signal $A_1$ and pump $A_2$ by $$A = \sqrt{A_1 A_2}$$

Figure 4:
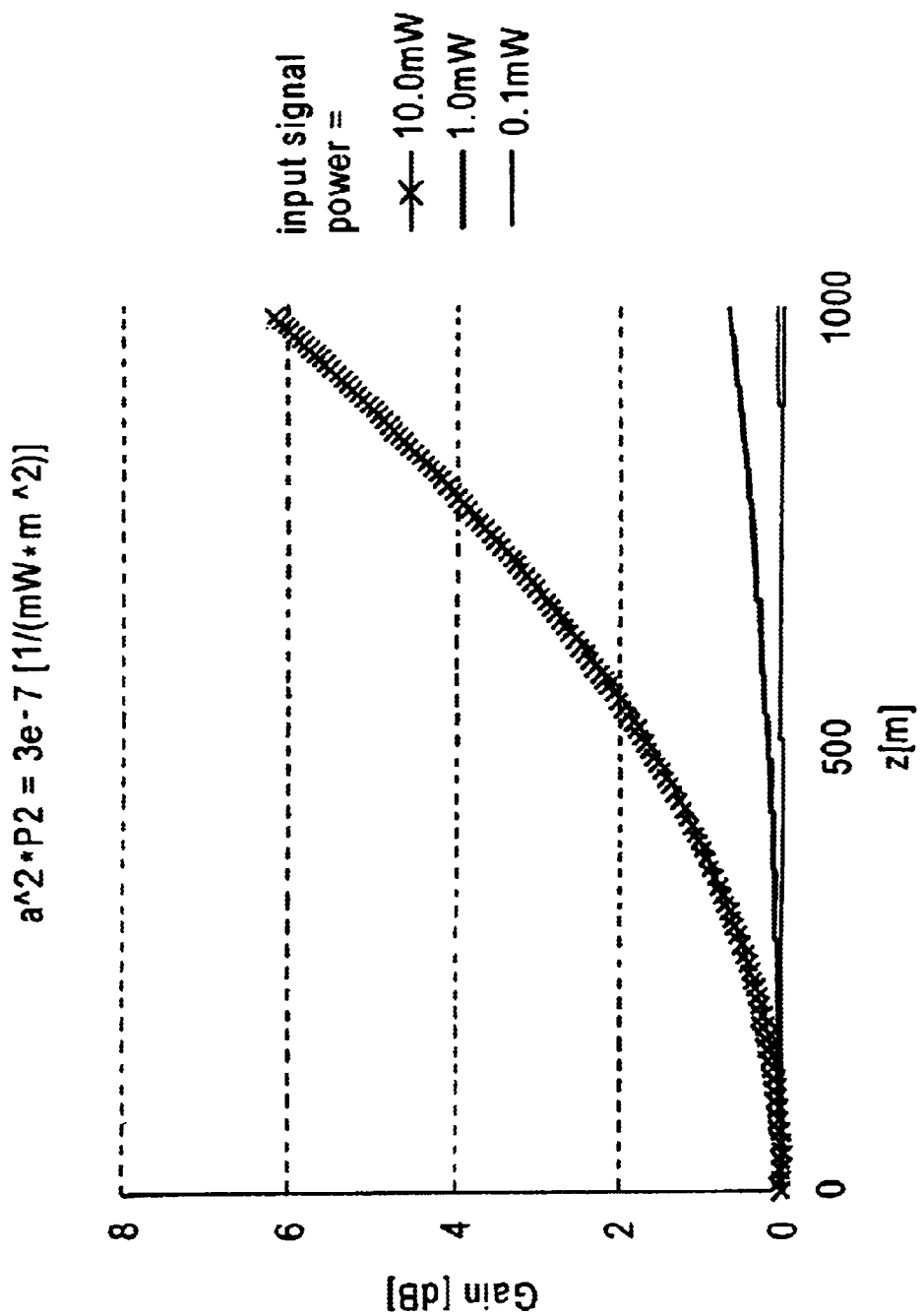
FIG. 4 is a graph showing the gain that a signal experiences during propagating the fiber in accordance with the invention shown in FIGS. 1 and 2.

FIG. 4 is a graph showing the gain that the signal experiences during propagating the fiber, which is calculated based on the expression (3), where it is assumed that $n^{(2)}=3*10^{-20}$ m²/W, $\lambda 1=1545$ nm, and $A=2$ μm², so that $a^2=6*10^{31\ 10}$ mW⁻²m⁻². The input pump power is $P_2=500$ mW, and three cases for the input signal power $P_1$ are considered, that is $P_1=10$ mW, 1 mW, and 0.1 mW.

As shown in FIG. 4, the gain increases with the increase in the input signal power $P_1$. As a result, the pulses in the signal are amplified, but the noise having low power is not amplified, so that the signal to noise ratio (SNR) of the signal is improved.

While the fiber length is 1 km in the present embodiment, a similar effect to improve SNR can be obtained with a shorter fiber when the optical fiber has a higher nonlinear refractive index, for example higher than $10^{-19}$ m²/W. Such a high nonlinear refractive index can be realized using, for example, a compound glass or silica glass doped with bismuth.

Figure 5:
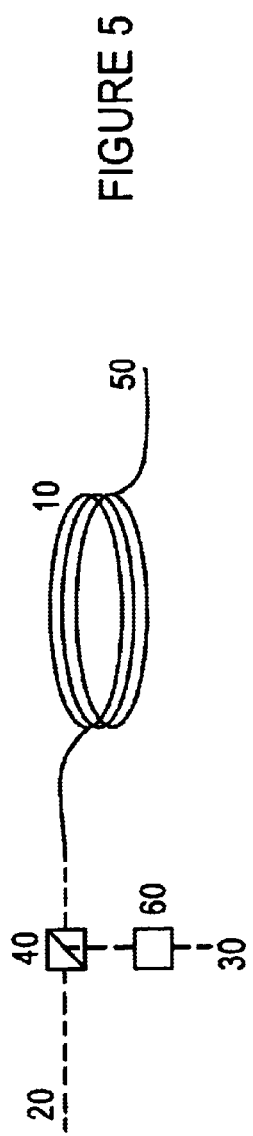
FIG. 5 is a schematic diagram of a modification of the optical module shown in FIG. 1.

FIG. 5 is a schematic diagram of a modification of the optical module shown in FIG. 1. The multiplexing means 40 is coupled to an end of the optical fiber 10. The optical signal at the wavelength λ1 is launched into the first port 20 in the fundamental mode, and the optical pump at λ2 is launched into the second port 30 in a certain mode (for example, the fundamental mode). The multiplexing means 40 combines the optical signal and the optical pump. The mode transforming means 60 modifies the wavefront of the optical pump so that the optical pump, passing through the multiplexing means 40, couples to the higher-order mode of the optical fiber 10 that satisfies the condition that the higher-order mode at λ2 and the fundamental mode at λ1 have substantially equal phase index. This configuration is preferable because an optical source that generates the optical pump in the fundamental mode, such as a laser diode, can be used.

FIGS. 6–8 illustrate additional modifications. FIG. 6 differs from FIG. 5 in that the multiplexing means 41 has an effect of modifying the wavefront of the optical pump, so that the optical pump couples to the higher-order mode of the optical fiber 10. In the modification of FIG. 7, the mode transforming means 60 lets the optical signal and pump pass through, but selectively modifies the wavefront of the optical pump, so that the optical pump couples to the higher-order mode of the optical fiber 10. In the modification of FIG. 8, the mode transforming means 61 is a part of the optical fiber 10 and lets the optical signal and pump pass through, but selectively modifies the wavefront of the optical pump, so that the optical pump couples to the higher-order mode of the optical fiber 10. It is preferable that such a mode transforming means is realized by a fiber grating spliced to the optical fiber 10, or by a fiber grating directly written onto the optical fiber 10.

Figure 9:
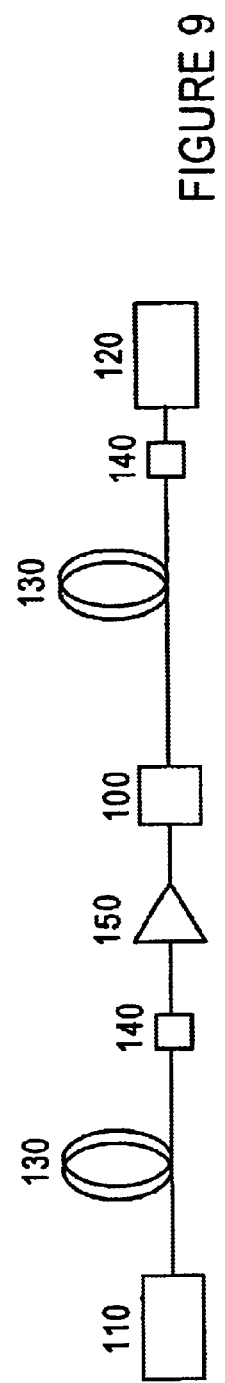
FIG. 9 is a schematic diagram of an embodiment of optical communication system in accordance with the present invention.

FIG. 9 is a schematic diagram of an embodiment of optical communication system. A signal generated by optical transmitter 110 propagates over a transmission fiber 130. Dispersion compensating means 140 can be used to compensate the dispersion of the transmission fiber and roughly recovers the original optical waveform of the signal. Amplifying means 150 amplifies the optical power of the signal and compensates for the optical losses due to the transmission fiber and the dispersion compensating means. The signal after the amplifying means usually includes noise due to amplified spontaneous emission in the amplifying means, and nonlinear processes in the transmission fiber and/or the dispersion compensation means. That noise is suppressed by the optical module 100, such as those illustrated in FIGS. 1 and 5–8. After the noise suppression, the signal propagates over another transmission fiber and another dispersion compensating means, and finally received by optical receiver 120. Since the optical module 100 suppresses the noise accompanying the signal, it expands the capacity and length of optical communication.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

What is claimed is:

1. An optical module comprising:
   an optical fiber having a guided mode with phase index n1 at a wavelength λ1, and a guided mode with phase index n2 at a wavelength λ2, and n2 is substantially equal to n1;
   a multiplexing means having an output coupled to the optical fiber, a first input coupled to a first port and a second input coupled to a second port; wherein the first port is coupled for receiving an optical signal at a wavelength λ1;
   the second port is coupled to an optical pump for receiving pump radiation at a wavelength λ2=(λ1)/3; and
   the optical signal and the pump radiation are combined by the multiplexing means and launched into an end of the optical fiber.

2. An optical module as recited in claim 1, wherein the guided mode of the optical fiber at the wavelength λ2 is a higher-order mode.

3. An optical module as recited in claim 2, wherein the optical fiber comprises:
   a core region having an average refractive index; and
   a cladding region surrounding the core region, the cladding region comprising a main medium having a predetermined refractive index, and a sub medium having a refractive index different from that of the main medium, a plurality of regions of the sub medium being arranged in the main medium; wherein
   the core and cladding regions extend along the fiber, and the average refractive index of the core region is higher than the average refractive index of the cladding region.

4. An optical module as recited in claim 3, wherein the main medium is silica glass that is pure or doped with one or more dopants belonging to a group composed of germanium, fluorine, chlorine, phosphorus, nitrogen, aluminum, titanium, erbium, ytterbium, neodymium, praseodymium, and bismuth, and the sub medium is a gas or vacuum.

5. An optical module as recited in claim 3, wherein the main medium is glass having a nonlinear refractive index greater than or equal to $10^{\wedge}(-19)$m²/W, and the sub medium is a gas or vacuum.

6. An optical module as recited in claim 2, further comprising a mode-transforming means coupled between the second port and the fiber for coupling the fundamental mode to one or more higher-order modes at the wavelength λ2.

7. An optical module as recited in claim 6, wherein the mode-transforming means is coupled between the second port and the multiplexing means.

8. An optical module as recited in claim 6, wherein the mode-transforming means is a part of the multiplexing means.

9. An optical module as recited in claim 6, wherein the mode-transforming means is coupled between the multiplexing means and the optical fiber.

10. An optical module as recited in claim 6, wherein the mode-transforming means is a part of the optical fiber.

11. An optical module as recited in claim 2, wherein an optical source of the pump generates radiation in one or more higher-order modes at the wavelength $\lambda 2$.

12. An optical module as recited in claim 2, wherein the guided-mode of the optical fiber at the wavelength $\lambda 2$ is a $HE_{1m}$ mode with m being an integer larger than unity.

13. An optical fiber comprising:
   a core region having an average refractive index; and
   a cladding region surrounding the core region, the cladding region comprising a main medium having a predetermined refractive index, and a sub medium having a refractive index different from that of the main medium, a plurality of regions of the sub medium being arranged in the main medium; wherein
   the core and cladding regions extend along the fiber, the average refractive index of the core region is higher than the average refractive index of the cladding region, and
   the optical fiber has a guided mode with phase index n1 at a wavelength $\lambda 1$, and a guided mode with phase index n2 at a wavelength $\lambda 2$, and n2 is substantially equal to n1.

14. An optical system comprising:

an optical transmitter for generating an optical signal at a wavelength $\lambda 1$;

an optical receiver for receiving an optical signal;

a transmission line for transmitting a generated optical signal; and an optical module coupled via the transmission line to the optical transmitter and coupled to the receiver, the optical module comprising:

an optical fiber having a guided mode with phase index n1 at a wavelength $\lambda 1$, and a guided mode with phase index n2 at a wavelength $\lambda 2$, and n2 is substantially equal to n1;

a first port coupled to the transmitter for receiving an optical signal generated at a wavelength $\lambda 1$;

a second port coupled an optical pump for receiving pump radiation at a wavelength $\lambda 2=(\lambda 1)/3$;

a multiplexing means having two inputs coupled to the first and second ports for combining the generated signal and the pump radiation and having an output coupled to the optical fiber.

* * * * *